US012673280B2

(12) United States Patent
    Reinosa

(10) Patent No.:  US 12,673,280 B2
(45) Date of Patent:  Jul. 7, 2026

(54) HYBRID FILTER ELEMENT APPARATUS

(71) Applicant: Adan Reinosa, Montebello, CA (US)

(72) Inventor: Adan Reinosa, Montebello, CA (US)

( * ) Notice: Subject to any disclaimer, the term of this patent is extended or adjusted under 35 U.S.C. 154(b) by 555 days.

(21) Appl. No.: 17/803,963

(22) Filed: Feb. 8, 2023

(65) Prior Publication Data

US 2024/0261710 A1      Aug. 8, 2024

(51) Int. Cl.

| | |
|---|---|
| *B01D 29/15* | (2006.01) |
| *B01D 29/56* | (2006.01) |
| *B01D 35/00* | (2006.01) |
| *B01D 35/147* | (2006.01) |
| *B01D 39/12* | (2006.01) |
| *F01M 1/10* | (2006.01) |
| *F15B 21/041* | (2019.01) |

(52) U.S. Cl.
    CPC ........... *B01D 35/147* (2013.01); *B01D 29/15* (2013.01); *B01D 29/56* (2013.01); *B01D 35/005* (2013.01); *B01D 39/12* (2013.01); *F01M 1/10* (2013.01); *F15B 21/041* (2013.01); *B01D 2201/345* (2013.01); *B01D 2201/347* (2013.01); *F01M 2001/1028* (2013.01)

(58) Field of Classification Search
    CPC ...... B01D 35/147; B01D 29/15; B01D 29/56; B01D 35/005; B01D 39/12; B01D 2201/345; B01D 2201/347; B01D 29/58; F01M 1/10; F01M 2001/1028; F15B 21/041

USPC ...... 210/323.2, 97, 121, 130, 119, 136, 314, 210/335, 440, 443, 455, 483, 488, 210/DIG. 13, 494.2
    See application file for complete search history.

(56) References Cited

U.S. PATENT DOCUMENTS

| | | | | |
|---|---|---|---|---|
| 2,843,268 A | * | 7/1958 | Kennedy | B01D 29/54 210/295 |
| 3,397,786 A | * | 8/1968 | Hultgren | B01D 27/103 210/136 |
| 2003/0106847 A1 | * | 6/2003 | Sann | B01D 35/303 210/418 |

* cited by examiner

*Primary Examiner* — Madeline Gonzalez

(57)      ABSTRACT

Vehicles or machinery equipped with full flow spin-on, canister or reusable filters can benefit by including advanced or bypass grade parallel filtration. Incorporating advanced filtration is generally difficult due to impractical lubrication system access, cramped engine bays, and some installation solutions require engine modifications and hardware. An apparatus of the present invention provides advanced filtration when used inside well-known manufactured forms of spin-on, cartridge, or reusable filters. The unit installs as a complete unit, without modifications, or external hardware to any engine at the spin-on filter point of attachment, inside the canister housing, or inside a reusable filter form. The apparatus uses the structures of the normally provided filter to enable a bolt-on installation. The apparatus increases filtration efficiency, capacity, easier maintenance, while providing environmental benefits.

4 Claims, 5 Drawing Sheets

HYBRID FILTER ELEMENT APPARATUS

BACKGROUND OF THE INVENTION

The present invention relates to apparatuses that provide complementary advanced fine filtration to engines or hydraulic systems.

Description of Prior Art

The benefits of Bypass Filtration, or Advanced Filtration, through research by the US Department of Energy through the Argonne Laboratory, SAE, and others, yield an impressive array of benefits, among them: oil life extended up to 10 times, oil filter full flow extended from 3 to 5 times, emissions reduced by up to 15% due to reduced friction and parasitic energy losses, lower engine overhaul costs, and modest fuel efficiency increases in the order of 3 to 5%.

Background

The current set up of a bypass system is first connecting it to the oil high pressure supply in an engine, usually found through a "tee" connection at the oil pressure sending unit or using an adapter between the oil filter and the engine, a labor-intensive process. In addition, the return of the purified oil must be done through modifications either to the sump plug at the bottom of the engine, or returned through the oil filling cap, again requiring labor, modifications, and know-how. Many devices have been invented to avoid using extensive external hardware or delivering bypass grade filtration using external hardware. The present invention delivers the desired filtration by using a hybrid media using at least two media filter grades and harnessing natural and generated differential pressures during operation.

Prior art examples are found in the following US Patents: U.S. Pat. No. 7,090,773, to Meddock and Swanson for a Coaxial full-flow and bypass oil filter; U.S. Pat. No. 6,951,606, to Cousineau and Allen for an Auxiliary filtration system. More examples for combining full flow and high-density filtering have been integrated in one single unit, such as shown in Dahm, et al., U.S. Pat. No. 4,036,755. However, such a filtering system is not made in such a manner that is easily connected to the standard engine filtering system. Beardsley, U.S. Pat. No. 2,680,520 shows a full-flow and part-flow filter combination. It has the same inherent problems as the previously described full-flow and part-flow filters. These problems may be exhibited by a recently developed combination full flow and a bypass grade Teflon sintered disc, with a rather small loading area for the bypass section, generously estimated to be limited to a cross section of the spin-on combination filter, such as U.S. Pat. No. 6,605,215, to Assion for a Hybrid spin-on oil filter, and U.S. Pat. Nos. 7,048,848, 8,123,942, and 8,241,494 to Assion for, again, a Hybrid spin-on oil filter and similar configurations.

Other examples can be found in U.S. Pat. No. 6,666,968, to Smith et al. for a Fluid filtration apparatus; U.S. Pat. No. 5,843,284, to Waters et al. for Two-stage oil bypass filter device, U.S. Pat. No. 5,695,637, to Jiang et al. for a Combination full flow and bypass filter with venturi nozzle, U.S. Pat. No. 9,109,478 to Reinosa for a Method and apparatus for a parallel bypass filtration system for internal combustion engines and similar systems, U.S. Pat. No. 6,488,848 to Smith for a Cleanable filter with ported cylinder adjacent screen, U.S. Pat. No. 10,195,553 to Baxter for an Oil filter apparatus, U.S. Pat. No. 8,282,821 for an Oil filter assembly and associated filter element to Maier et al., U.S. Pat. No. 9,815,004 for a Filter with a liquid drain valve to Uhl, et al., and U.S. Pat. No. 6,322,697 for an Oil filter assembly to Hacker, et al.

Further examples of prior art include U.S. Pat. No. 2,843,268A, Fram Corp. for a Combined full-flow and part-flow oil filters; EP1108456A1, Nelson Industries, Inc. for a Combination full flow and bypass filter with venturi nozzle; U.S. Pat. No. 6,350,379B1, Dana Corporation for a Dual filter with flow mixer; U.S. Pat. No. 20030226795A1, Baldwin Filters, Inc., for an Environmentally friendly dual lube venturi filter cartridge; U.S. Pat. No. 6,761,822B1, Dana Corporation for a Dual filter with flow mixer and centrifugal separator; U.S. Pat. No. 20050126965A1, Meddock Leroy J. for a Coaxial full-flow and bypass oil filter; U.S. Pat. No. 20070261377A1 to Klug Jerry J for a Spin-on filter arrangement and methods; U.S. Pat. No. 20080078716A1 to Hepo Filters, Inc. for a Bypass oil filter system and method of installing same; U.S. Pat. No. 7,704,397B2 to Filtran LLC for a Coaxial full-flow and bypass oil filter having cap with blades; U.S. Pat. No. 7,704,396B2 to Filtran LLC for a Coaxial full-flow and bypass oil filter with spring/gasket arrangement; U.S. Pat. No. 3,021,955A to Purolator Products Inc. for a Filter unit with restrictor means; U.S. Pat. No. 4,869,820A to Gary Karlin for a Filter apparatus for fluids with co-axially stacked filter elements; EP0631803A1 to Fleetguard, Inc. for a Combination full flow and bypass filter with venturi nozzle; U.S. Pat. No. 3,022,679A1 to Baldwin Filters, Inc. for an Environmentally friendly dual lube venturi filter cartridge full-flow and bypass oil filter; U.S. Pat. No. 20050252838A1 to Baldwin Filters, Inc. for a Fluid filtration apparatus and method; U.S. Pat. No. 20060037906A1 to Assion Norbert for a Liquid filter assembly; U.S. Pat. No. 20060278570A1 to Meddock Leroy J. for a Coaxial full-flow and bypass oil filter apparatus and method; U.S. Pat. No. 9,109,478B2 to Pareto Point Industries, Inc. for a Method and apparatus for a parallel bypass filtration system for internal combustion engines and similar systems; U.S. Pat. No. 9,932,868B2 to Adan Reinosa for an Apparatus for providing fine filtration to hydraulic systems and internal combustion engines.

SUMMARY OF THE INVENTION

A long-felt and still unfulfilled need exists to provide an oil filter for an internal combustion engine or hydraulic system equipped with a spin-on, cartridge, or reusable type oil filters that provides advanced filtration in a strictly bolt-on simple and quick manner, without need for modifications to the engine, extensive labor and materials such as additional hoses, fittings, filter heads, nor affixing brackets as extensively taught by previous art. The present invention provides complementary advanced filtration, fine filtration, or bypass filtration, to engines or hydraulic systems equipped with a spin-on, cartridge, or reusable filters in a new approach by taking advantage of commonalities and well-known structures in filters and engines. The typical bypass grade installation, as illustrated by prior art, is an intensive process for material and labor. There is still the need to install the system at a point of high oil pressure from the system since generally the filter media is resistant to flow due to its tight pore size. In addition, once the pressure side is installed, a return to the oil must be provided.

The present invention, a hybrid filter element apparatus in combination with well-known normally provided filter enclosures, has many advantages over previous art: quick and simple bolt-on installation, inexpensive to manufacture, a minimal design, quick and simple connection with no hydraulic conduits needed, no engine modifications needed, no need to encroach the limited engine bay space, quick and easy filter element replacement, no need for a parasitic oil flow or side stream oil from the engine or hydraulic system, and in one application it is reusable, attributes of the present invention that solve disadvantages found in prior art traditional bypass systems.

In spin-on oil filter equipped engines or hydraulic systems, the hybrid filter element apparatus of the present invention, manufactured in combination with the well-known structure of a spin on oil filter, simply replaces the normal spin-on oil filter element and then attaches to the normally provided threaded oil filter stud point of attachment. In canister filters the hybrid filter element apparatus is manufactured to replace the well-known normally provided filter cartridge inside the normally provided canister housing. In the case of renewable filters, a reusable hybrid filter element apparatus, or a non-reusable hybrid filter element apparatus simply is replaced inside a well-known normally provided reusable filter enclosure.

The hybrid filter element apparatus is substantially shaped as a thick-walled cylinder having at least two filter sections: the upstream filter section, or upper filter section, made with full flow filtering media; the downstream filter section, or lower filter section, made with a high efficiency advanced filtration filter media. The two sections are assembled one on top of the other and a flat washer, or similar rigid structure such as a filter cap having a centrally located orifice restriction, is sandwiched between the two filter sections. The orifice restriction flat washer, or similar structure, also is optionally designed to be larger than the outside diameter of the upper filter section.

The hybrid filter element, comprised of at least two sections and the washer is made to provide parallel advanced filtration by having a set of differential pressures acting across the lower filter section and is generated during use, singly or in combination, by:

1. a flat washer having a centrally located orifice restriction sandwiched between the upper and lower filter sections, a first differential pressure contributor, DP1

2. a larger washer diameter than the outside diameter of the upper filter section, acting as a flow restriction by reducing the annular flow area between the upper filter element and the filter internal wall enclosure, a second pressure differential contributor, DP2

3. a larger external diameter of the upper filter section with respect to the external diameter of the lower section, acting as a flow restriction by reducing the annular flow area between the upper filter element and the filter internal wall enclosure, a third pressure differential contributor. DP3

4. a smaller inner diameter of the lower filter section acting as a flow restriction pipe, a fourth pressure differential contributor, DP4

5. a dam effect generated by the larger external diameter of the upper filter section with respect to the external diameter of the lower section, acting as a flow restriction, a fifth differential pressure contributor, DP5

6. a check valve having a predetermined cracking pressure between the upper filter and the lower filter section, a sixth differential pressure contributor, DP6

7. a check valve having a variable cracking pressure between the upper filter and the lower filter section, a seventh differential pressure contributor, DP7

8. a flow restriction lip around the internal periphery of the filter enclosure, acting as a flow restriction by reducing the annular flow area between the upper filter element and the filter internal wall enclosure, an eight differential pressure contributor, DP8

9. a necked area inside the inner diameter tube of the lower filter section generates a Venturi effect zone that in combination with a plurality of flow limiting orifices adjacent to the Venturi effect zone generates a ninth differential pressure contributor, DP9

10. a flow pressure loss across the full flow filtering media, a tenth pressure differential contributor, DP10.

The hybrid filter element is intended to be used as designed inside a well-known spin on oil filter structure, or inside the well-known canister housing, or inside a reusable structure which is designed as a similar structure as that of a spin-on oil filter. The washer or the upper filter element external larger diameter, having a larger diameter than the lower filter section is designed to reduce the effective flow annulus area that is formed between the periphery of the washer or the upper filter element, and the internal wall of the spin on filter, or the inside wall of the canister housing, or the inner cylindrical surface of the reusable filter structure. The fifth pressure differential contributor is therefore generated by a dam effect and the flow restriction generated by the effective reduction of the annular flow area.

The net effect of interest for the present invention is that the apparatus now has a motive power behind the achievement of parallel flows through the lower filter element. The net differential pressure is guaranteed to promote the flow across the relatively tighter, when compared to the upper filter element, advanced filtration media of the lower filter section.

The high efficiency cartridge filter element of the present invention works by design at a low pressure drop across its media element, less than 10 PSI, when compared to traditional bypass filtration media systems requiring 40 PSI or more, due to its construction and it is therefore more energy efficient than traditional systems requiring said high-pressure gradient to effect flow across it. It should be noted that this high efficiency media is not intended to perform the duty of a full flow filter therefore a plurality of flow limiting orifices is provided to reduce or regulate the parallel oil flow across it. The key attribute that should be noted is that the filter media requires a low pressure, less than 10 PSI, to effect slow and steady flow across the media at all engine operating conditions, i.e.: across all RPM rotational and mechanical loading conditions, flowing even at idle oil pressures, usually 1 Bar (14.7 PSI) and across all pressures until redline RPM, as opposed to traditional bypass grade media systems that begins to effect flow at substantially higher RPM from idle RPM.

It is clear that the hybrid filter element is shaped, as a thick-walled cylinder, so that it can be manufactured and used inside a well-known spin-on oil filter form, replace the well-known paper cartridge form, replace the reusable filter element, all forms having generally a cylindrical internal cavity where the hybrid filter element is nested inside the cylindrical form. The hybrid filter element can also be designed such that the upper filter section is made using a reusable stainless-steel mesh, and the lower filter is just a replacement element, furthering its environmentally friendly function.

The hybrid filter element can be further simplified by designing the upper filter section of a larger external diameter than the lower filter section diameter, the larger filter diameter periphery being positioned sufficiently close to the internal cylindrical surface of the filter enclosure to generate a restriction effect by reducing the annulus flow area between the upper filter periphery and the enclosure inside wall. In addition, increasing the external diameter also increases the available media for a longer service filter interval. Likewise, the lower filter section can be designed with a smaller inside diameter than the upper section so that it can be a natural pipe restrictor, mimicking the washer orifice restriction function while simultaneously providing for more filter media as the difference between the external and internal diameter of said lower filter section is maximized therefore having more available media for a longer service interval.

A bypass valve, whose function is to open at a predetermined pressure, may also be provided should the flow restrictor, or the combined filter elements, become plugged or obstructed to flow i.e.: due to very cold oil, allowing unfiltered oil to prevent engine damage.

Yet another application is equipped with a variable differential pressure feature, a spring-loaded adjustable restrictor instead of the static orifice restrictor. The adjustable restrictor can be dialed, at its simplest design, by having a threaded adjusting screw that compresses a spring against a metal ball, essentially an adjustable check valve, that allows to increase the differential pressure according to the filter application such as a racer desiring to filter faster across the high efficiency element during a race as opposed to a motorist in city driving leaving the adjustment screw at its minimum setting.

The assembled unit, as in the spin on filter case and reusable filter case, simply screws in the point of connection of the normally provided threaded oil filter stud, all the plumbing associated with the traditional prior art bypass filter installation is eliminated, as is the energy and labor-intensive process of seeking for a pressure point and an oil return path back to the engine.

Yet another benefit is the longer life of the full flow filter element. Since a proven benefit of advanced filtration is the sharing of the filtering load, the full flow element service interval can be extended 3 to 5 times its normal life cycle, allowing the upper element to survive longer when compared to the same size element without the assistance of the lower element. This reduces the negative environmental footprint of illegally or improperly discarded used oil filters by having a longer service interval unit.

The apparatus operational strategy follows: once oil flow from the engine oil pump flows toward the engine through the upper filter element it encounters a mild obstruction modeled as a single flow restrictor disposed upstream of the lower filter element, the advanced filtration media element. This restriction forces, in part as a component of a net total differential pressure, the total flow to split into two flows: one that goes through the full flow filter element, a full flow to receive full flow filtration, and another, a smaller parallel flow, a continuum of peripheral flows around the lower filter element, the high efficiency advanced filtration element, that are diverted, due to the pressure differential created in part by the restriction, through a path that is forced to flow through the advanced filtration cartridge filter element. The parallel flows are further aided by differential pressure contributors such as the pressure differential created by the full flow upper element filter media, filter structures, inherent frictional and viscous flow losses. An additional differential pressure contributor is generated by making the upper filter with a larger external diameter than the lower filter. The increase of the external diameter of the upper filter reduces the effective annular flow area existing between the internal wall of the spin-on filter, the cartridge filter, or the internal wall of the reusable oil filter enclosure, thereby generating a restriction to the oil flow around the upper filter. The parallel flows across the lower filter element are controlled by a plurality of flow control orifices, drilled around a flow control tube, that limit the amount of flow though it since the role of the lower filter is to slowly filter the oil at a higher filtering efficiency not to perform the function of the full flow filter, the upper filter element.

Once the diverted oil goes through the lower filter advanced filtration filter media it rejoins the flow through said flow control orifices to reconstitute the total flow into the normally provided engine threaded engine oil filter stud, or canister point of discharge and into a lubrication gallery inlet of an engine or hydraulic system. The total flow into the engine is cleaned to a ratio of (Parallel Flows/Total Flow) during operation, where parallel flows are, for illustration purpose shown as only one flow in the drawing sheets, the oil flow across the apparatus advanced filter media element, and full flow which is the oil flow across the upper filter element, during all engine operating conditions. The high efficiency filter requires a low pressure drop across its media element, less than 10 PSI, due to its construction and it is therefore more energy efficient than the traditional counterpart of traditional system requiring a high-pressure gradient to effect flow across it. In either case, the rating of said high efficiency filter is desired to be within a range down to below one micron to 50 microns in cross-sectional area, and preferentially made with synthetic filtering media or similar. It is also desirable to have said filter endowed with chemicals or/and additives that can be time released to lengthen the oil or hydraulic fluid service interval.

Given those reasons above, the present invention is more resourceful, functional, and its strategy of connection leads it to be more readily accepted by the buying public, saving time, labor, the environment, and our domestic natural resources.

DETAILED DESCRIPTION OF THE DRAWINGS

Figures 1, 2:
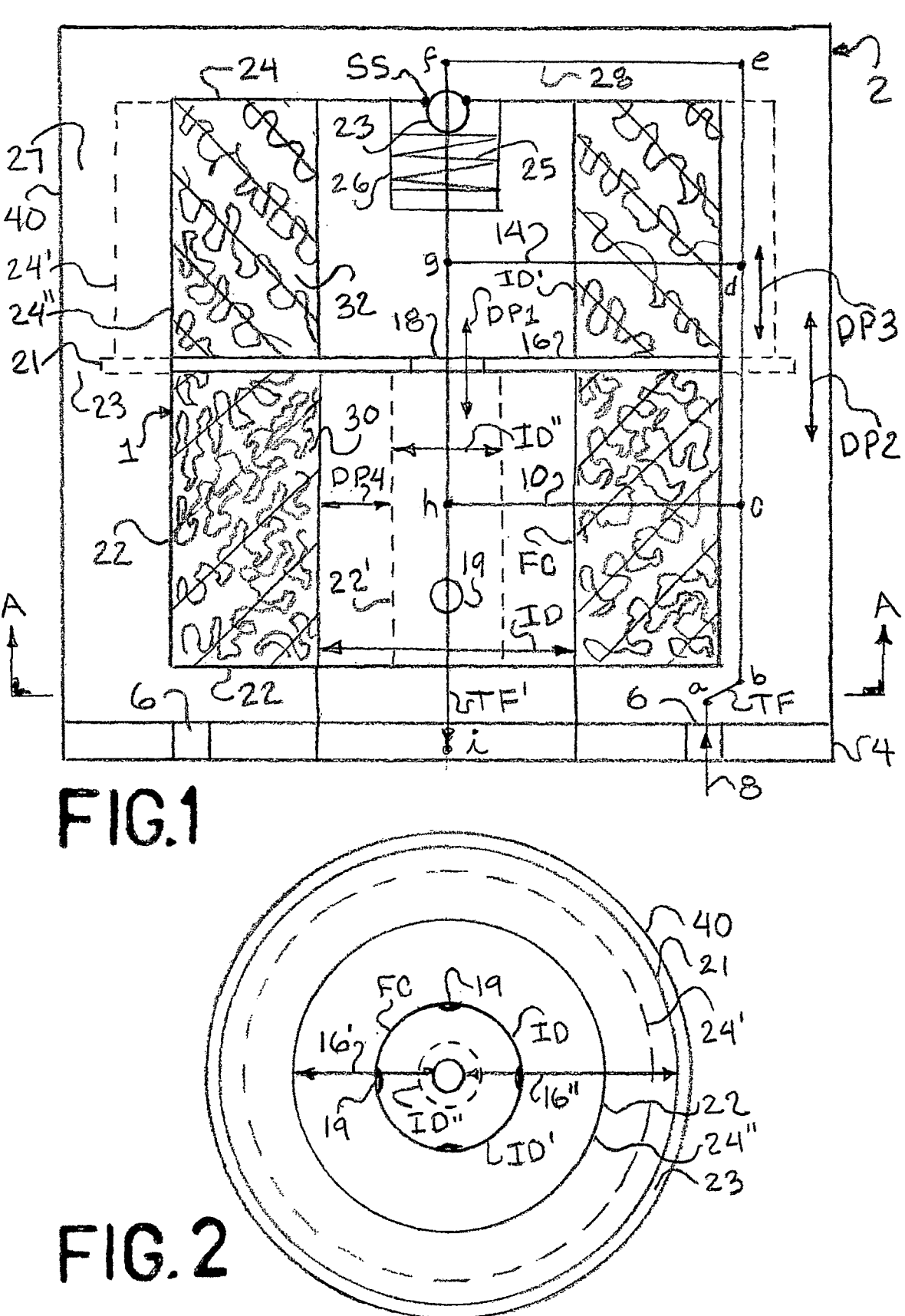
FIG. 1 Is a cross section showing the main components, structures, and hydraulic flows of the hybrid filter element apparatus inside a typical cylindrical filter envelope showing design features to achieve differential pressures.
FIG. 2 Is a cross section view A-A of FIG. 1 of the hybrid filter element showing key structures and relationships with the enclosure internal wall and design features needed to generate pressure differentials.

Referring to FIG. 1, it shows a hybrid filter element 1 nested inside a typical well-known structure a cylindrical filter form 2, the filter form defines a cylindrical wall 40 that together with a bottom plate 4 defines a sealed enclosure nesting the hybrid filter element 1. During use of the filter form 2, a normally provided oil flow 8 is introduced though a plurality of intake orifices 6, where the multiple oil flow 8 constitutes a total flow TF and it is represented by a hydraulic path (a b c h i), a secondary flow 10, and by a hydraulic path (a b c d g h i), a full flow 14.

Still referring to FIG. 1, the hybrid filter element 1 is comprised by a lower filter section 22 made using a high efficiency advanced filtration media 30, an upper filter section 24 made using a regular full flow media 32, and a restrictor plate 16 having an orifice constriction 18. Placing the upper filter section 24 together with the lower filter section 22 produces a useless negligible flow across the advanced filtration media 30 because the full flow media 32 will offer the oil a path of least resistance essentially short circuiting the secondary flow 10 across the lower filter section 22 because of the relative high resistance to flow when compared to the upper filter section 24 having a low resistance to flow media.

Still referring to FIG. 1, flow across the lower filter section 22 is achieved by introducing differential pressure generators, such pressure differentials produced across a hydraulic point (c), and a hydraulic point (h). A first differential pressure DP1 is generated by introducing the restrictor plate 16 having the orifice constriction 18 between the upper filter section 24 and the lower filter section 22. A second differential pressure DP2 is generated by having a restrictor plate periphery 21 to increase in diametrical direction as to approach the cylindrical wall 40 thereby reducing an annular flow area 23. In a similar fashion, a third differential pressure DP3 is generated by increasing the diameter to a new increased diameter 24' of the upper filter section 24 to approach the cylindrical wall 40 thereby reducing an upper filter annular flow area 27 that alone or in combination with the second differential pressure DP2 would help promote oil flow across the lower filter section 22. Still referring to FIG. 1, a fourth differential pressure DP4 is generated by decreasing an inside diameter ID of the lower filter section 22 to a new internal diameter ID″ thereby decreasing the effective flow area through the lower filter section 22 and introducing additional viscous losses that jointly effect the fourth differential pressure DP4.

During use the total flow TF is split into two representative flows, the secondary flow 10, now enabled by said differential pressures alone or in combination, and the full flow 14 whereby the total flow TF is equal to a downstream total flow TF', which in turn is equal to the sum of the secondary flow 10 and the full flow 14 where the oil is purified by a ratio of (secondary flow 10)/(TF').

Still referring to FIG. 1, during certain operating conditions such as extremely low lubricant temperature, or clogging of the filter elements, a bypass valve 26 is provided to allow the total flow TF, or a portion of it, to flow through, for example, the bypass valve 26 well known architecture consisting of a biasing spring 25, pushing on a sealing ball 23 against a sealing surface SS, wherein during operation the valve opens at a predetermined differential pressure to avoid starving the engine of oil, a bypass oil flow 28 follows a bypass hydraulic path (a b c d e f g).

Now referring to FIG. 2, a cross section view A-A of FIG. 1 of the hybrid filter element showing key structures and relationships with the enclosure internal wall and design features needed to generate pressure differentials such as the increased radial positioning of the restrictor plate periphery 21, increasing from an original radius 16' to a new radius 16″, that generates the reduced upper filter annular flow area 23, a new increased diameter 24' from an original diameter 24″, the reduction of the inside diameter ID of the lower filter section 22 to the new internal diameter ID″. It should be noted that by increasing the outside diameter of the upper filter section 24 and decreasing the internal diameter of the lower filter section 22 a collateral benefit is achieved while promoting the creation of differential pressures, that is the increase in the media available to promote a longer service interval for the filtering unit.

Now referring to FIG. 1, a flow limiting orifice 19 plurality, drilled around the periphery of a flow control tube FC, is provided to limit the amount of oil flowing through the lower filter section 22 as it is not designed to flow large oil volumes as the upper filter section 24, but a slow and reduced volume filtered according to the advanced filtration media 30 filtering efficiencies and specifications. The high efficiency advanced filtration media 30 requires a low pressure drop across it, less than 10 PSI, due to its construction and it is therefore more energy efficient than the traditional counterpart of traditional system requiring a high-pressure gradient to effect flow across it. In either case, the rating of said lower filter section 22 is desired to be within a range down to below one micron to 50 microns in cross-sectional area. It is also desirable to have said filter section 22 endowed with chemicals or/and additives that can be time released to lengthen the oil or hydraulic fluid service interval.

Figures 3, 4:
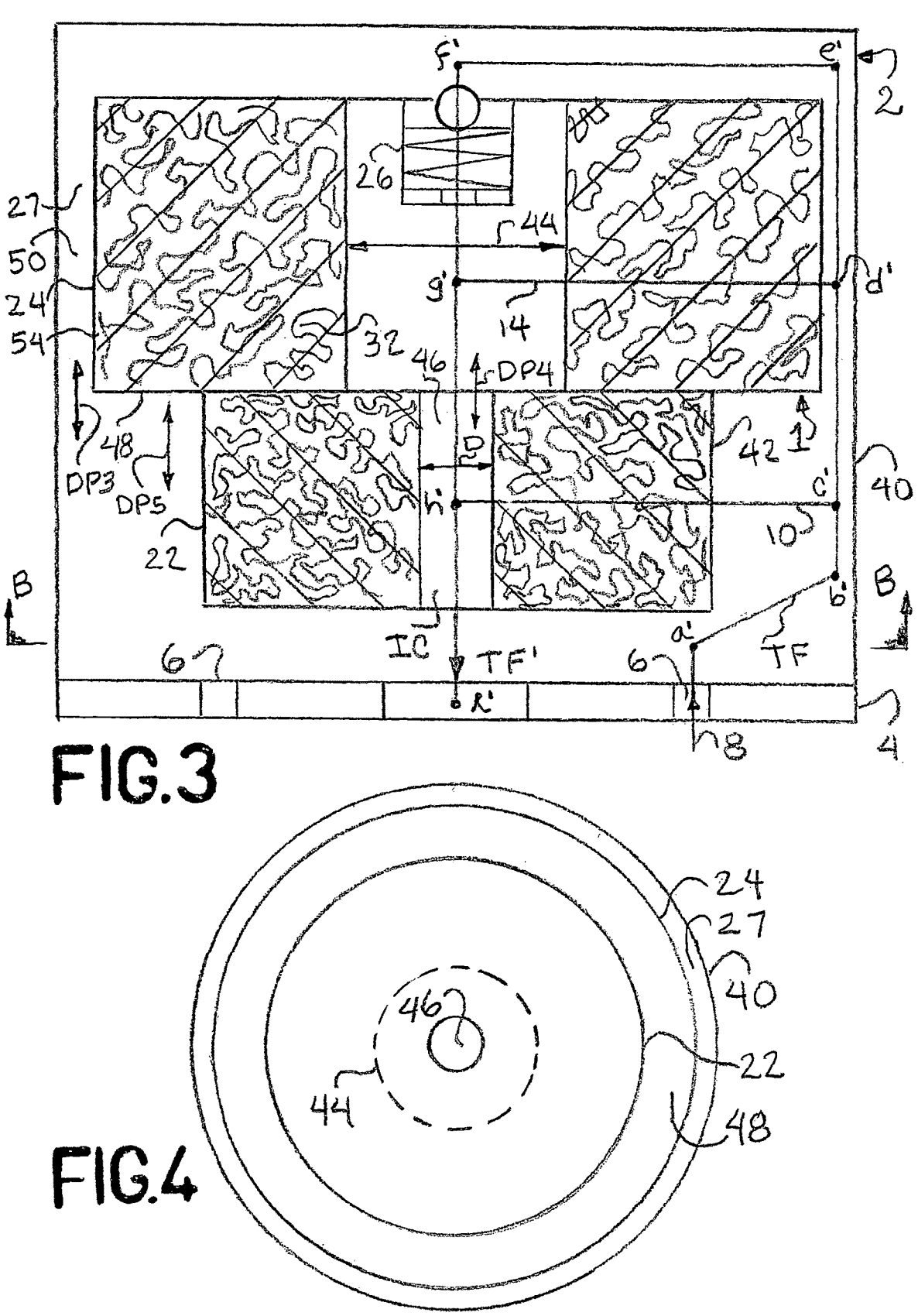
FIG. 3 Is a cross section showing the main components, structures, and hydraulic flows of the hybrid filter element inside a typical cylindrical filter envelope having the upper and lower filter as flow restrictions.
FIG. 4 Is a cross section view B-B of FIG. 3 of the hybrid filter element showing key structures and relationships with the enclosure internal wall and design features needed to generate pressure differentials.

Now referring to FIG. 3, a cross section showing the main components, structures, and hydraulic flows of the hybrid filter element 1 inside a typical cylindrical filter envelope 2 having the upper filter section 24 and the lower filter section 22 as flow restrictors. The total flow TF is made to flow into the filter unit 2 though the plurality of intake orifices 6 and follows a hydraulic path (a' b' c' h' i'), the secondary flow 10, and a hydraulic path (a' b' c' d' g' h' i'), the full flow 14, combining at a hydraulic point h' to form a hydraulic flow (h' i'), reconstituting the total flow TF into the downstream total flow TF'. In this application the differential pressure DP3, due to the reduced upper filter annular flow area 27 and an annular dam effect area 48, generating a differential pressure DP5, plus the differential pressure DP4 due to a reduced diameter D of the lower filter section 22, a small diameter constriction 46 of an internal channel IC, promote the secondary flow 10 across the lower filter section 22 and the full flow 14 across the upper filter section 24. This application is also shown with the bypass valve 26, whose function has been well described previously, where upon bypass valve 26 activation a bypass flow (d' e' f' g') is generated.

Referring now to FIG. 4, a partial cross section view B-B of FIG. 3 of the hybrid filter element showing key structures and relationships with the enclosure 2 and the wall 40 plus the design features needed to generate pressure differentials DP3 and DP4. The reduced upper filter annular flow area 27 is shown generated between the filter upper section 24 diameter and the wall 40, the annular dam effect area 48 is also shown, as well as the small diameter constriction 46 and an internal diameter 44 of the upper filter element 24.

It is clear to those skilled in the art that filter enclosure 2, wall 40, plate 4, are presented here as an architecture that surrounds the hybrid filter apparatus 1 and design features that promote the differential pressures essential for the apparatus 1 to be functional and useful, the enclosures are meant to be examples of applications of apparatus 1 in manufactured spin on oil filters, replacement cartridges for canister applications, and reusable filters where the filter elements can be replaced inside a reusable envelope.

Figures 5, 6:
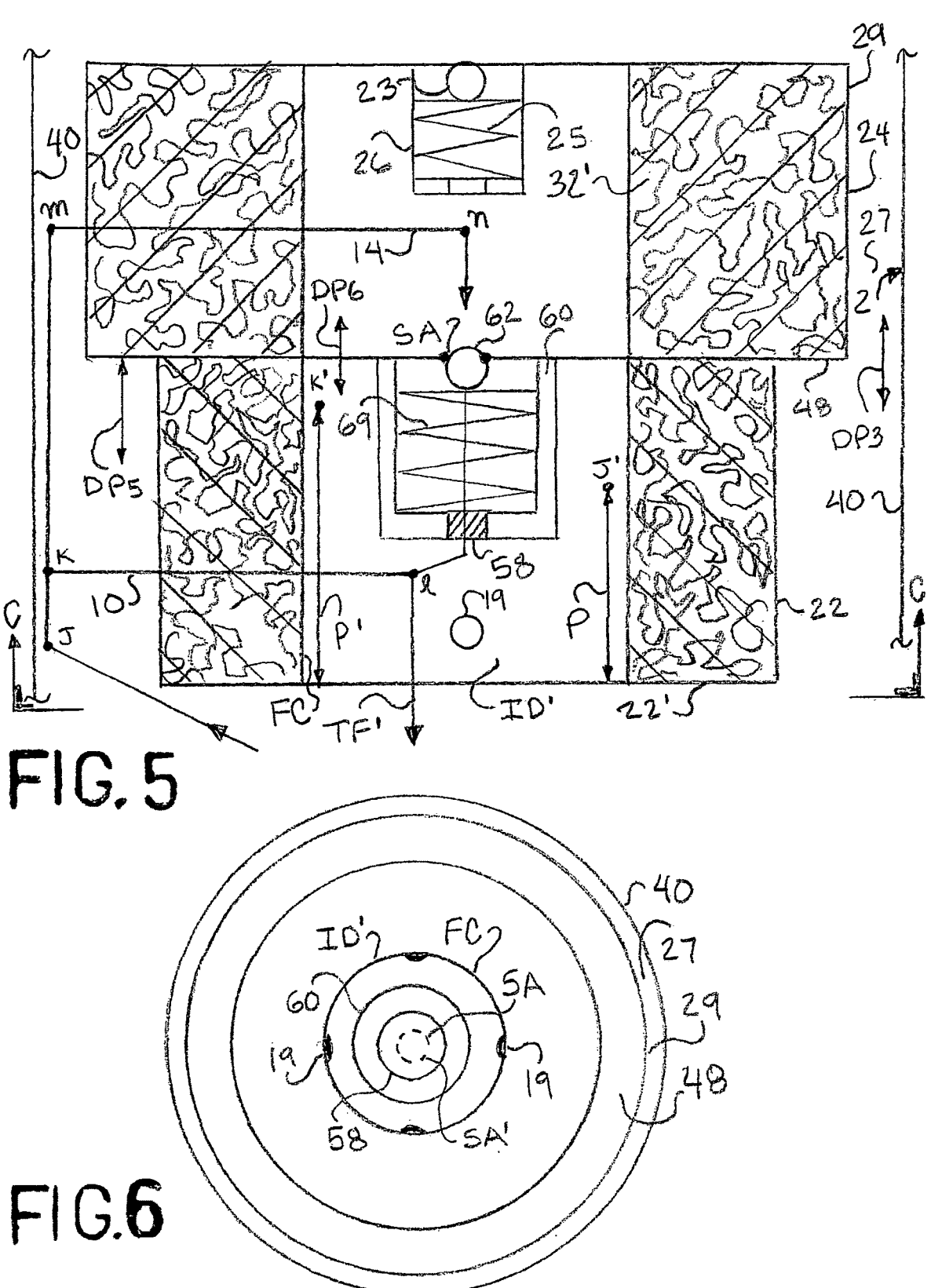
FIG. 5 Is a cross section showing the main components, structures, and hydraulic flows of the hybrid filter element inside a typical cylindrical filter envelope having the upper filter as a flow restrictor, having a spring biased differential pressure generator.
FIG. 6 Is a cross section view C-C of FIG. 5 of the filter element application showing key structures and relationships with the enclosure internal wall and design features needed to generate pressure differentials.

Now referring to FIG. 5, a cross section showing the main components, structures, and hydraulic flows of the hybrid filter element inside the typical cylindrical filter envelope 40, represented by two lines for simplicity, having the upper filter section 24 as a flow restrictor, the differential pressure DP3, having a spring biased differential pressure generator 60, a differential pressure DP6, the annular dam effect area 48, the differential pressure DP5.

Still referring to FIG. 5, The total flow TF is made to flow into the filter unit 2 and follow a hydraulic path (j k 1), the secondary flow 10, and a hydraulic path (j km n), the full flow 14, combining at a hydraulic point (1) to reconstitute the total flow TF into the downstream total flow TF'. In this application the differential pressure DP6, due to a sealing area SA acting as an orifice restriction SA' is shown in FIG. 6. Referring to FIG. 5, the spring biased differential pressure generator 60 has a biasing spring 64, a flow outlet orifice 58, a flow restriction ball 62, continuously biased to seal against sealing area SA which contributes a part of the differential pressure DP6. The reduced upper filter annular flow area 27 and the annular dam effect area 48, generating the differential pressures DP3 and DP5 respectively. Depending on operating conditions during use it shows a ball position k', and a ball position j', the displacement distance is equated to a biasing force dictated by the well-known equation for a spring where the "delta" increase in force is given by K×(spring displacement) where position k' is at a lower pressure than position j', the linear increase of differential pressure DP6 is dictated by that behavior. The differential pressures DP3, DP5, and DP6, and the sealing area SA acting as the orifice restriction 18, promote the secondary flow 10 across the lower filter section 22 and the full flow 14 across the upper filter section 24. This application is also shown with the bypass valve 26, whose function has been well described previously. The flow limiting orifice 19 plurality, drilled around the periphery of the flow control tube FC, is provided to limit the amount of oil flowing through the lower filter section 22 as it is not designed to flow large oil volumes as the upper filter section 24.

Now referring to FIG. 6, a cross section view C-C of FIG. 5 of the filter element application showing key structures and relationships with the enclosure wall 40 and design features needed to generate the pressure differentials DP3, DP5, DP6. It shows the enclosure wall 40, an upper filter section outside diameter 29, together defining the reduced upper filter annular flow area 27 and the annular dam effect area 48. Shown also is the orifice restriction SA', defined by the sealing area SA, the flow outlet orifice 58, yet another minor differential pressure contributor of DP6, and the spring biased differential pressure generator 60. The flow control tube FC and associated flow control orifices 19 are also shown.

Figures 7, 8:
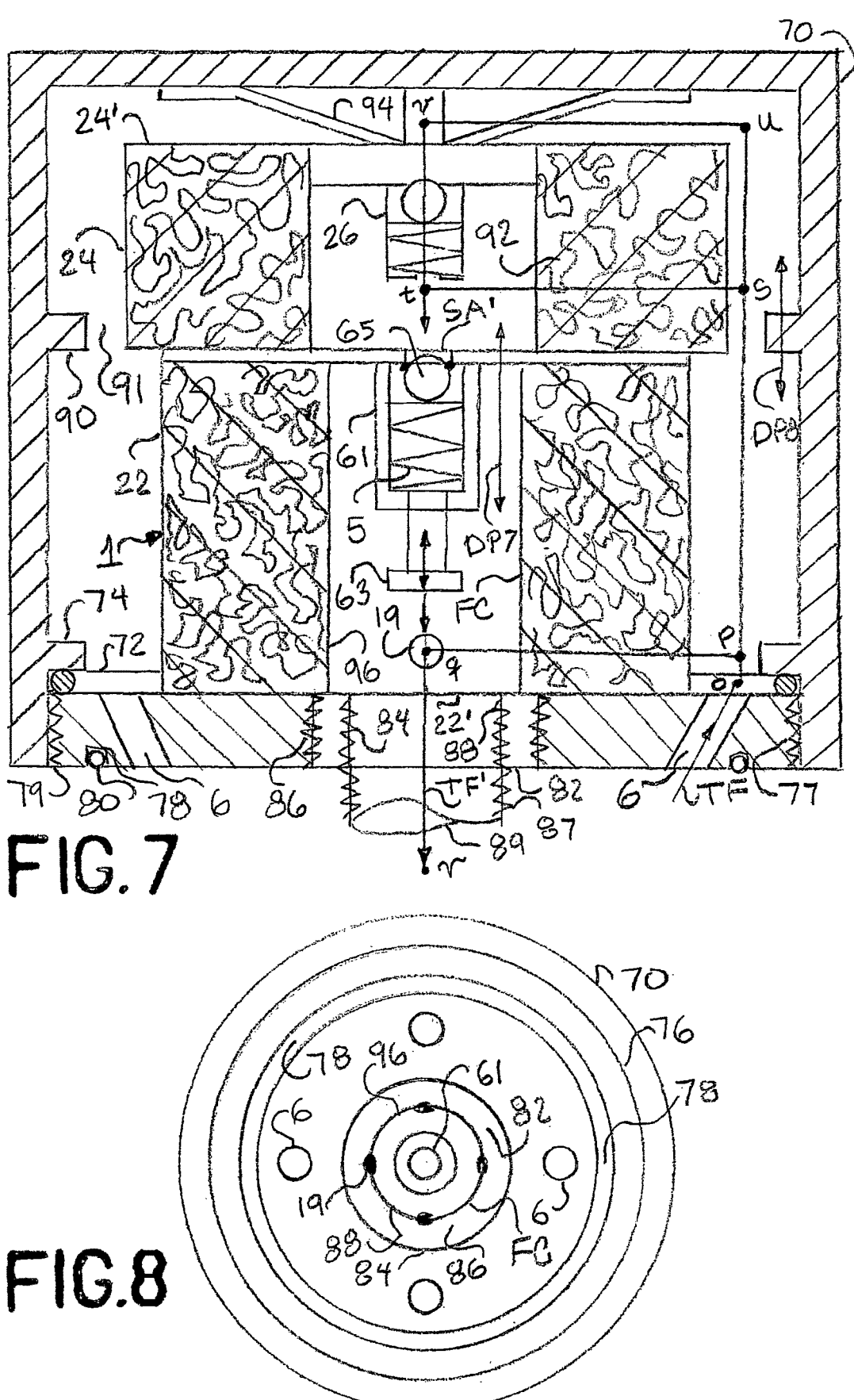
FIG. 7 Is a cross section showing the main components, structures, and hydraulic flows of a reusable hybrid filter element inside a typical cylindrical reusable filter envelope having the upper filter as a reusable filter element and having a variable differential pressure feature.
FIG. 8 Is a bottom view of the filter of FIG. 7 showing key structures and relationships with the enclosure internal wall and having a variable differential feature.

Now referring to FIG. 7, a cross section showing the main components, structures, and hydraulic flows of a reusable hybrid filter element 24' inside a typical cylindrical reusable filter envelope 70 application having the upper filter section 24 as a reusable filter element and having a variable differential pressure valve 61, the valve 61 has an adjusting screw 63 which can bias a calibrated spring 5 pushing a valve ball 65 to increase or decrease a pressure differential DP7 in addition to an orifice restriction SA' defined by the valve ball 65 sealing area. The filter envelope 70 is equipped with a restriction lip 90 that effectively reduces an annular flow area 91, a differential pressure DP8. Still referring to FIG. 7, the total flow TF is pressurized into the filter envelope 70, through the intake orifices 6, and follows a hydraulic flow (o p q r), the secondary flow 10, and a hydraulic flow (o p s t q r), the full flow 14, secondary flow 10 and full flow 14 reconstitute the total flow TF at a hydraulic point (q) and exits envelope 70 as the downstream total flow TF' at a hydraulic point (r). The flow limiting orifices 19, drilled around the periphery of the flow control tube FC, plurality is provided to limit the amount of oil flowing through the lower filter section 22 as it is not designed to flow large oil volumes as the upper filter section 24.

Still referring to FIG. 7, this reusable application shows the application versatility of the hybrid filter element 1 where during rebuilding the element, the upper filter section 24 is made with a reusable cleanable metal mesh media 92, and the lower filter element 22 is removed and replaced with a clean filter section for another service interval of use. Still referring to FIG. 7, it shows an adapter ring 82 having a set of adapter ring internal threads 88 and a set of adapter ring external threads 86. The set of internal threads are designed and changed to match a normally provided set of external threads 87 of a normally provided oil filter stud 89, the set of external threads match a set of sealing plate threads 84 in such a way that the envelope 70 is a universal fit to all applications requiring the adapter ring 82 to change according to the required set of threads 87.

Still referring to FIG. 7, it shows a sealing plate 76 having a seal pocket 78 and a bottom seal 80 whose function is to seal against the well-known normally provided sealing surface of a typical engine or hydraulic system. The sealing plate 76 is equipped with a set of external threads 77 that fully engage a set of internal threads 79 and in so doing the plate 76 seals against a sealing surface 22' of the lower filter section 22 while simultaneously sealing the filter envelope 70 by compressing a plate seal 72 against an envelope sealing protrusion 74 and simultaneously biasing a positioning spring 94 against the upper filter element 24. This application is also shown with the bypass valve 26, whose function has been well described previously, where upon bypass valve 26 activation a bypass flow (s u v t) is generated.

Now referring to FIG. 8, a partial bottom view of the filter of FIG. 7 showing key structures and relationships with the filter enclosure 70, showing the plurality of intake orifices 6, the seal pocket 78, the sealing plate 76, the set of sealing plate threads 84 that match the set of adapter ring external threads 86, the adapter ring 82 showing the set of adapter ring internal threads 88, the variable differential pressure valve 61, and the flow limiting orifices 19 drilled around the periphery of flow control tube FC.

Figures 9, 10:
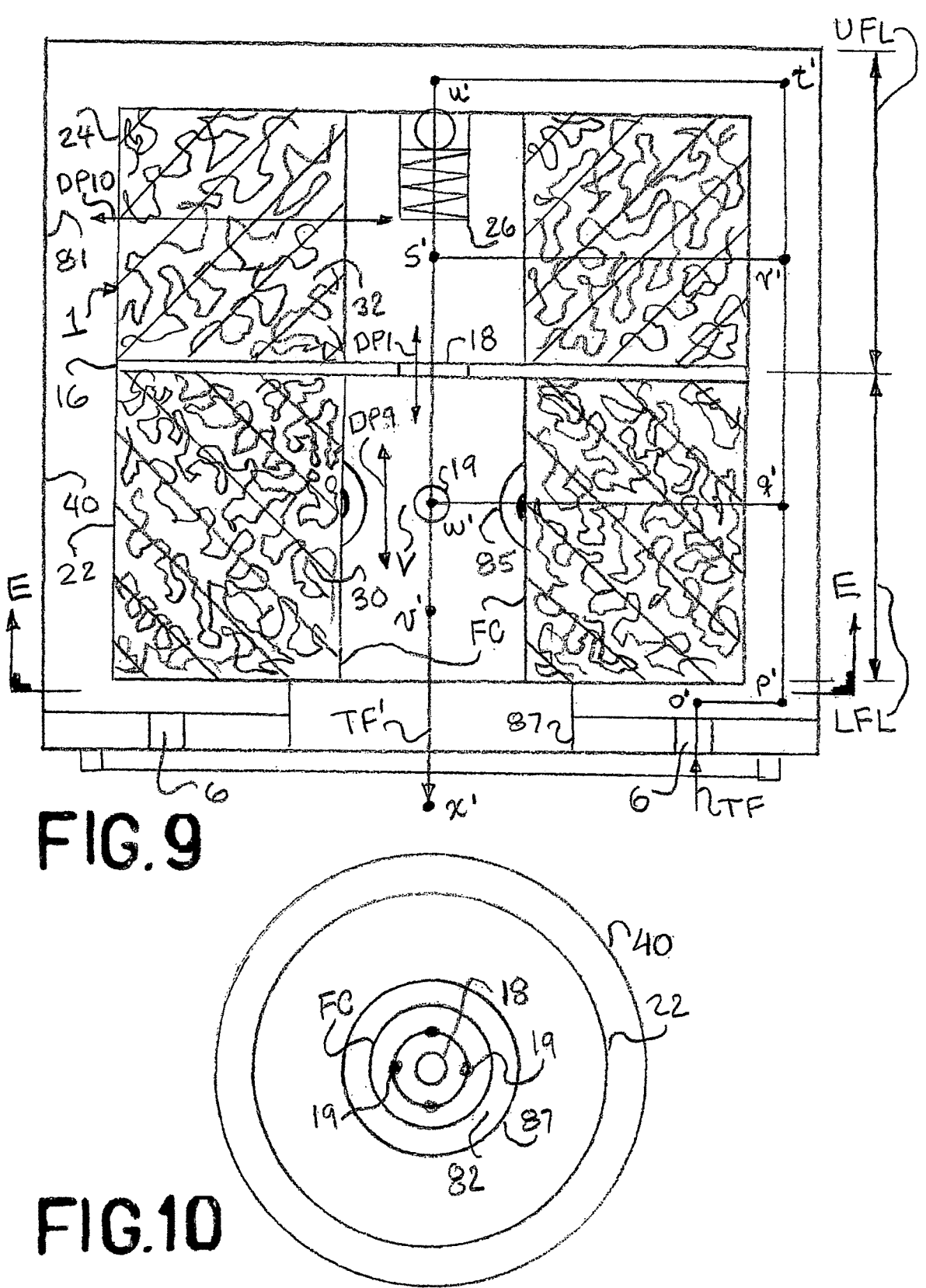
FIG. 9 Is a cross section showing the main components, structures, and hydraulic flows of a typical spin on filter having the hybrid filter element inside a typical cylindrical structure filter envelope and having a Venturi effect zone.
FIG. 10 Is a cross section view E-E of FIG. 9 of the spin on style filter showing key structures and relationships with the enclosure internal wall and design features needed to generate the Venturi effect pressure differential.

Now referring to FIG. 9, it shows a cross section showing the main components, structures, and hydraulic flows of a typical manufactured spin on oil filter having the hybrid filter element 1 enclosed by a typical cylindrical structure filter envelope 81 and having a Venturi effect zone V that promotes a differential pressure DP9 at hydraulic point (w'), said Venturi effect zone V placed contiguous or adjacent or in close proximity to the flow limiting orifice 19 plurality. The Venturi effect zone V is created by providing a necked section 85 to the flow control tube FC. The total flow TF is pressurized during operation through the plurality of intake orifices 6 and establishes a hydraulic flow (o' p' q' w' x'), the secondary flow 10, and a full flow path (o' p' q'r's' w' x'), a full flow 14, both reconstitute the total flow TF at a hydraulic point (w') and exits the filter envelope 81 as the downstream total flow TF'. This application is also shown with the bypass valve 26, whose function has been well described previously, where upon bypass valve 26 activation a bypass flow (r' t' u's') is generated. This application uses the restrictor plate 16 having the orifice constriction 18 between the upper filter section 24 and the lower filter section 22, generating the differential pressure DP1. In addition, the upper filter element 24 provides, as the full flow media 32 loads with contaminant, yet another differential pressure contributor, a differential pressure DP10 that increases as the upper filter element loads and plugs up upon continued use by trapped contaminants. Still referring to FIG. 9, applicable to all the discussed applications, the overall length of the hybrid element is defined by an upper filter section length UFL plus a lower filter section length LFL, the proportions are a matter of design, but consideration must be given to the typical dirt distribution in engine oils. Research shows that more than 99% of contaminant particles are less than 20 microns in size, and most damaging particles are in the region of 2 to 10 microns. Therefore, the size of the upper element 24 can be reduced and the lower element 22 can trap most of the offending and damaging particles. As we reduce the size of the upper filter section 24 yet another differential pressure contributor emerges as the flow area is reduced.

Now referring to FIG. 10, it shows a cross section view E-E of FIG. 9 of the spin on style filter showing key structures and relationships with an enclosure wall 40 and design features needed to generate the Venturi effect zone V, the pressure differential DP9. In the same application of the adapter ring 82 of FIG. 7 having the set of external threads 87, the adapter ring 82 is applicable so that the spin on filter is manufactured using only one set of threads. This strategy allows for the filter to be a universal fit. It is also shown the flow control tube FC having the flow limiting orifice 19 plurality provided to limit the amount of oil flowing through the lower filter section 22.

It will be understood that each of the elements described above, or two or more together may also find a useful application in other types of methods differing from the type described above.

While certain novel features of this invention have been shown and described and will be pointed out in future claims, it is not intended to be limited to the details above, since it will be understood that various omissions, modifications, substitutions and changes in the forms and details of the device illustrated, and its operation can be made by those skilled in the art without departing in any way from the spirit of the present invention.

I claim:

1. A hybrid filter element apparatus for providing full flow and advanced fine filtration, said apparatus comprising:

an upper filter section, a lower filter section, said upper filter section and said lower filter section substantially shaped as a thick wall cylinder, said upper filter section having a closed top surface, an annular lower sealing surface, a cylindrical upstream full flow reusable cleanable metal mesh media surface, and a cylindrical downstream full flow reusable cleanable metal mesh media surface substantially defining an upper downstream tube, said lower filter section having an annular top sealing surface, an annular bottom sealing surface, a cylindrical upstream advanced filter media surface, and a cylindrical downstream advanced filter media surface substantially defining a lower downstream tube, said upper filter section annular lower sealing surface sealingly biased against said lower filter section annular top sealing surface, said lower downstream tube having a smaller diameter than said upper downstream tube, said lower filter section having said annular top sealing surface with a restriction orifice, said restriction orifice establishing a hydraulic connection between said upper downstream tube and said lower downstream tube, said restriction orifice defining a sealing area, a valve ball, said valve ball biased against said sealing area by a calibrated spring pushing said valve ball against said sealing area closing said hydraulic connection, said calibrated spring biased by an adjusting screw, said restriction orifice having said sealing area closed by said valve ball biased by said calibrated spring, adjusted by said adjusting screw enabling a variable differential pressure valve, said variable differential pressure valve enabled to increase or decrease by said adjusting screw generating a first differential pressure across said lower filter section, a cylindrical reusable filter envelope having a restriction lip located on an internal wall of said reusable filter envelope substantially at the same level of said upper filter section annular lower sealing surface and projecting radially inward from said internal wall creating an annular restriction by reducing an annular flow area between said restriction lip and said upper filter section annular lower sealing surface, generating a second differential pressure across said lower filter section, wherein prior to operation said cylindrical reusable filter envelope hydraulically connecting said cylindrical upstream full flow reusable cleanable metal mesh media surface and said cylindrical upstream advanced filter media surface to a normally provided oil flow into said filter envelope, said filter envelope having an outlet on a sealing plate hydraulically connecting an engine or a hydraulic system, said filter envelope outlet sealingly connected to said annular bottom sealing surface, and wherein operation a portion of said normally provided oil flow is made to flow first across said annular restriction, then flow across the upper filter section and through said upper downstream tube, through said valve ball and through said lower downstream tube where a differential pressure is generated between said cylindrical upstream advanced filter media surface and said internal cylindrical downstream advanced filter media surface, said differential pressure biasing a second portion of said normally provided oil flow to be channeled by said lower downstream tube and into said envelope outlet, whereby full flow and advanced filtration are simultaneously achieved.

2. The apparatus of claim 1, wherein a bypass valve is provided between said upper filter section closed top surface and said upper downstream tube.

3. The apparatus of claim 1, wherein a necked section is created inside said lower downstream tube to create a Venturi effect area thereby creating a third differential pressure across said lower filter section.

4. The apparatus of claim 1, wherein said filter envelope is equipped with a set of adapter rings, said adapter rings having a set of internal threads and a set of external threads, said internal threads designed to match a normally provided oil filter stud threads, said set of external threads matching threads on said sealing plate, thereby making said apparatus a universal fit filter form.

\* \* \* \* \*